United States Patent [19]

Grohmann

[11] Patent Number: 5,102,473
[45] Date of Patent: Apr. 7, 1992

[54] PROCESS AND DEVICE TO TRANSVERSELY CUT METAL WORKPIECES

[75] Inventor: Paul Grohmann, Maria-Enzersdorf, Austria

[73] Assignee: Messer Griesheim, Fed. Rep. of Germany

[21] Appl. No.: 560,807

[22] Filed: Jul. 31, 1990

[30] Foreign Application Priority Data

Aug. 9, 1989 [DE] Fed. Rep. of Germany ....... 3926278

[51] Int. Cl.⁵ .............................................. B23K 7/00
[52] U.S. Cl. ................................... 148/9 R; 266/50
[58] Field of Search ................. 148/9 R, 9.6; 266/48, 266/50, 94

[56] References Cited

U.S. PATENT DOCUMENTS 2,259,955 10/1941 Jones ................................. 148/9.6
3,443,803 5/1969 Wernicke ............................ 266/50
3,953,005 4/1976 Rokop et al. ........................ 266/50
4,202,707 5/1980 Hennecke ........................... 266/50
4,452,432 6/1984 Ehlert et al. ........................ 266/50
4,495,000 1/1985 Möller ............................... 148/9 R
4,908,070 3/1990 Grohmann ......................... 148/9 R Primary Examiner—Scott Kastler
Attorney, Agent, or Firm—Connolly & Hutz

[57] ABSTRACT

Metal pieces such as blooms, continuously cast billets and cogged ingots, are cut by a deep-frozen, liquid cutting medium, in particular liquid oxygen, exiting from a nozzle at high pressure. The workpiece is moved in the longitudinal direction and the nozzle is moved in the crosswise direction at an acute setting angle with respect to the longitudinal direction. As a result, it is possible to dispense with the travel segment of the workpiece and of the cutting nozzle in the longitudinal direction of the workpiece during the cutting process.

7 Claims, 2 Drawing Sheets

PROCESS AND DEVICE TO TRANSVERSELY CUT METAL WORKPIECES

BACKGROUND OF THE INVENTION

When cutting with a high-pressure liquid-oxygen jet such as the type known from West German patent no. DE-PS 35 43 657, the cutting speeds reached are markedly higher than those reached with the conventional flame cutting method. This also makes it possible, for example, when blooms are transversely cut, to reduce the travel segment of the cutting nozzle along the length of the bloom down to the width of the bloom in question (also see BHM Journal, volume 134 (1989), issue 5, pages 133 to 136 "Loxjet®- an autogenous flame cutting method for maximum cutting speeds", subtitle 4: areas of application for the Loxjet® method).

In this process, as is the case with strand flame cutting machines with gaseous oxygen, the cutting device is coupled to the bloom and the bloom as well as the cutting device are moved along the travel segment in the longitudinal direction. Simultaneously, there is a crosswise movement of the flame cutter. After the separating cut has been completed, the entire cutting device moves back to the beginning of the travel segment. This technique requires drives for the movement in the longitudinal direction as well as for the crosswise direction.

SUMMARY OF INVENTION

The task of the present invention is to create a cutting process without a travel segment and to reduce the non-productive times associated with it, while also simplifying the cutting device necessary for this purpose.

In accordance with the invention, the workpiece is moved longitudinally and the nozzle is moved in the crosswise direction at an acute angle and with respect to the longitudinal direction.

As a result of the crosswise movement of the high-pressure liquid-oxygen jet, which takes place at an acute setting angle with respect to the movement direction of the workpiece, it becomes advantageously possible to arrange the nozzle so that it is stationary with respect to the longitudinal movement of the workpiece, since the path traversed by the workpiece during cutting is compensated for by the inclined positioning, thus achieving a straight separating cut. Since, as a result, the travel segment of the bloom and of the cutting device is zero, there is no need for a longitudinal carriage or for a longitudinal drive or coupling element. Moreover, there are no non-productive times needed to transport the cutting device back to the beginning of the travel segment; it is only necessary to swing back or move back the flame cutter. It is also possible to advantageously eliminate these return movements if, after completion of a first cut, the pre-heating burner and the flame cutter are rotated back by 180° - 2a. This technique is especially favorable, because it is not necessary to switch off the high-pressure liquid oxygen jet.

In this process, the size of the setting angle is adjusted according to the speed of the workpiece as well as to the cutting speed, which, in turn, depends on the type and dimensions of the workpiece.

DETAILED DESCRIPTION

Figure 1:
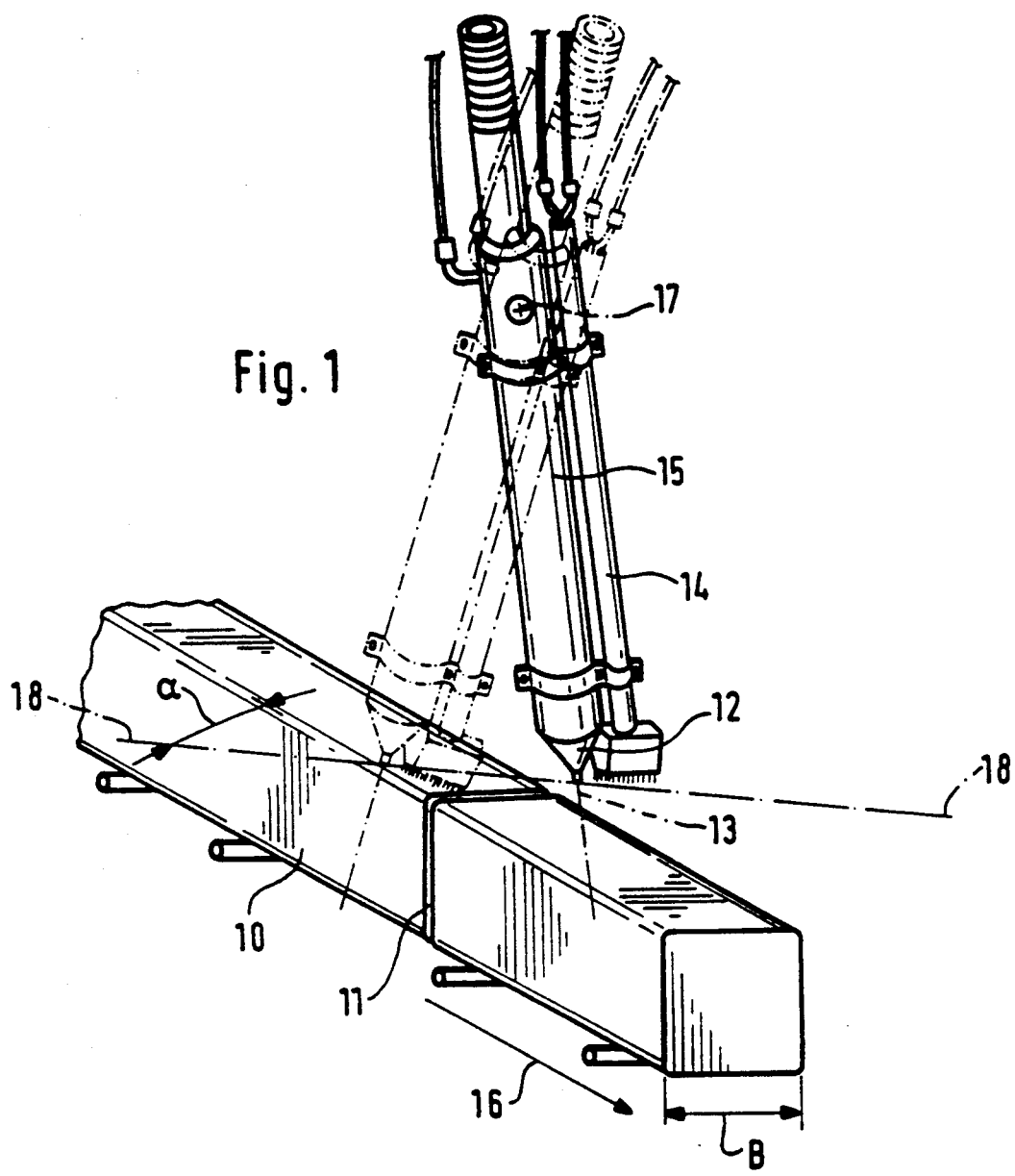
FIG. 1 is a perspective view illustrating a cutting device with a pendulum cutter in accordance with this invention.
Figure 2:
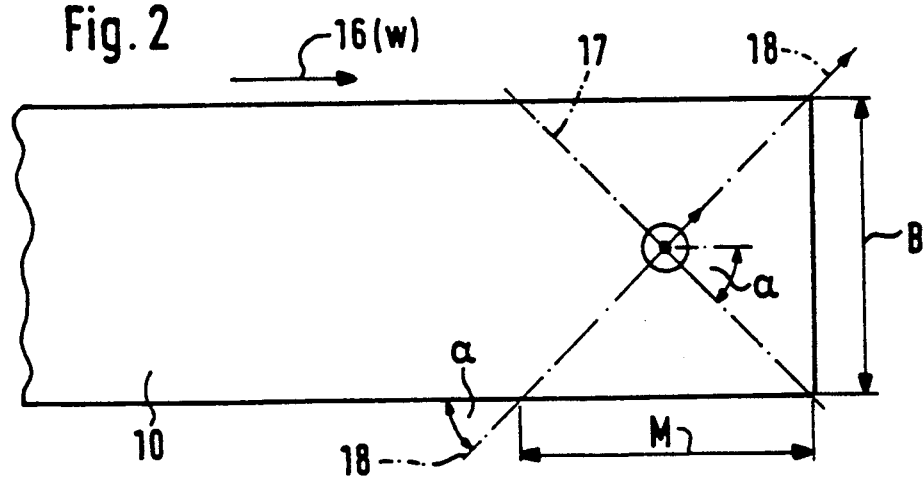
FIG. 2 schematically illustrates the process of using the device of FIG. 1.

FIGS. 1 and 2 show a continuous-cast billet which is to be transversely cut and which is designated as 10, for example, supported on rolls, whereby a separating cut 11 is made by means of a high-pressure liquid-oxygen jet 13 exiting via a nozzle 12. A pre-heating burner is designated as 14. The nozzle 12 is attached to a flame cutter 15. This flame cutter can be swung around a swiveling axis 17 centrally arranged above the billet 10 and at an acute setting angle a diagonally to the longitudinal direction 16(=direction of movement of the workpiece) (see, in particular, FIG. 2). The pendulum plane is designated as 18—18.

The billet 10 has, for example, a thickness D/width B of 200 mm each. At a cutting rate V = 1500 mm/min and a workpiece movement in the longitudinal direction 16 and a speed W = 1500 mm/min, the result is a theoretical travel segment M of 200 mm. The setting angle a then results from tangent $$a = \frac{B}{M} = 1 = 45°.$$

The setting angle a of the pendulum cutter 15 can be adjusted. In this manner, it is possible to easily compensate for changes in the speed of the workpiece during continuously exiting of the cast strands (=casting speed).

Figure 3:
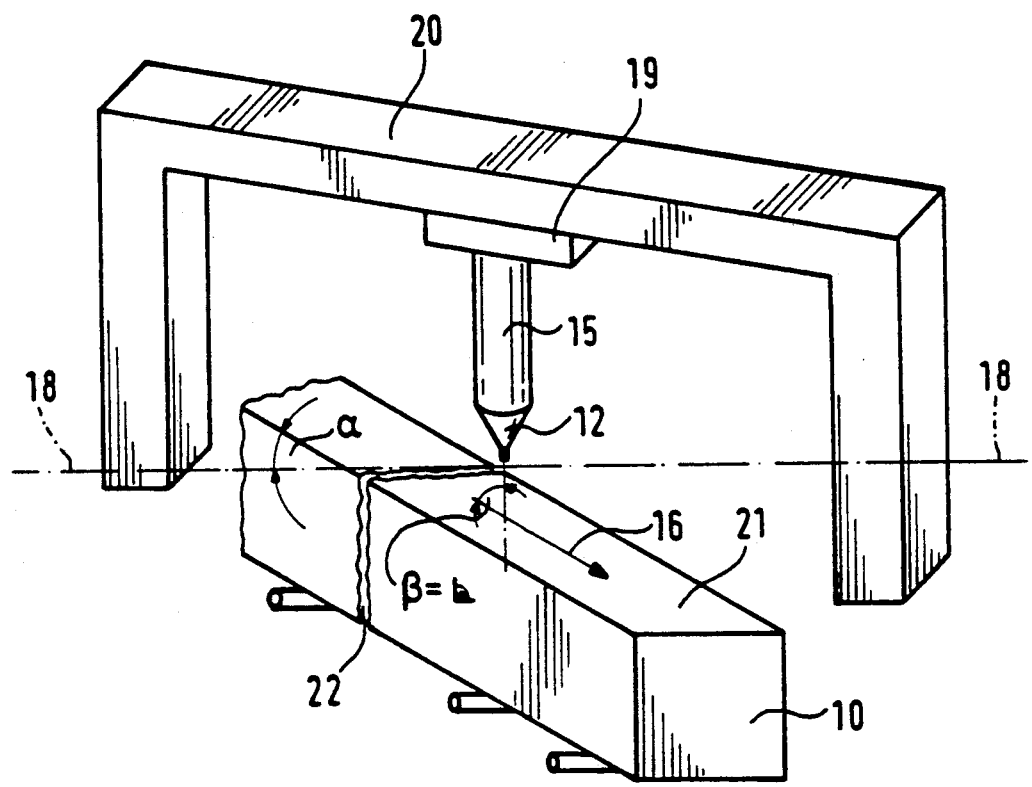
FIG. 3 is a perspective view of a cutting device with a transverse cutting carriage in accordance with this invention.

In the embodiment according to FIG. 3, the nozzle 12 is attached to a cutter 15 which can be moved (plane 18-18) in a crosswise carriage 19. The crosswise carriage 19 is held in a frame 20 which extends over the workpiece 10 at the setting angle a diagonally with respect to the longitudinal direction 16. By means of this device—since the cutter 15 and the nozzle 12 and thus the cutting jet 13 are always moved at a right angle B over the workpiece surface 21—a separating cut surface 22 is obtained, which is at a right angle to the workpiece surface 21.

What is claimed is:

1. In a process to transversely cut metal workpieces in which the separating cut is made by a deep frozen, liquid cutting medium exiting from a nozzle at high pressure, the improvement being in that the workpiece is moved in the longitudinal direction, the nozzle is moved independently of the workpiece movement, and the nozzle is moved in the crosswise direction at an acute setting angle with respect to the moving workpiece in the longitudinal direction.

2. Process according to claim 1, wherein the setting angle is adjusted according to the speed of the workpiece as well as according to the cutting speed of the cutting medium to result in a straight cut perpendicular to the longitudinal direction of movement of the workpiece.

3. Process according to claim 1, wherein the nozzle is attached to a pendulum flame cutter which can be rotated about a swivel axis centrally arranged at the acute setting angle and diagonally to the longitudinal axis above the workpiece.

4. Process according to claim 1, wherein the nozzle is attached to a flame cutter movable in a crosswise carriage held in a frame over the workpiece at the setting angle diagonally with respect to the longitudinal direction.

5. In a device for transversely cutting workpieces in which the separating cut is made by a deep-frozen, liquid cutting medium exiting from a nozzle at high pressure, the improvement being in the workpiece is movable in a longitudinal direction, and said nozzle being movable in the crosswise direction at an acute setting angle with respect to said longitudinal direction, said nozzle being attached to a pendulum flame cutter mounted to be swung around a swivelling axis centrally arranged at said acute setting angle and diagonally to said longitudinal direction above the workpiece.

6. In a device for transversely cutting workpieces in which the separating cut is made by a deep-frozen, liquid cutting medium exiting from a nozzle at high pressure, the improvement being in the workpiece is movable in a longitudinal direction, said nozzle being movable in the crosswise direction at an acute setting angle with respect to said longitudinal direction, and said nozzle being attached to a flame cutter which is arranged to be moveable in a crosswise carriage, said crosswise carriage being held in a frame which extends over the workpiece at said setting angle diagonally with respect to said longitudinal direction.

7. Process according to claim 1, wherein the metal workpieces are selected from the group consisting of blooms, continuously cast billets and cogged ingots, and the liquid cutting medium is liquid oxygen.

* * * * *